United States Patent Office 3,212,848
Patented Oct. 19, 1965

3,212,848
PROCESS FOR PRODUCING SODIUM CARBONATE
Paul Tasiaux, Boitsfort, Brussels, Belgium, assignor to Solvay & Compagnie, Brussels, Belgium
No Drawing. Filed Jan. 21, 1963, Ser. No. 252,567
13 Claims. (Cl. 23—63)

This invention relates to the production of sodium carbonate by reacting solutions of caustic soda with a carbonating agent constituted at least in part of sodium bicarbonate, in the presence of anhydrous sodium carbonate.

The continually increasing need for chlorine and the resulting increase in its production have brought about, during recent years, a considerable increase of installations for the electrolysis of sodium chloride. Since these installations produce chlorine and caustic soda in equivalent amounts, the problem of disposing of the excess of the caustic soda has presented itself for urgent solution.

This problem can be solved only by the production of chlorine without the simultaneous production of caustic soda, or by finding new uses for the caustic soda.

It is for this reason that the carbonation of caustic soda solutions obtained by electrolysis of sodium chloride, which has aroused only little attention in the past, has recently become the object of increased interest.

Different methods have been suggested for the carbonation of caustic soda solutions obtained by the electroylsis of sodium chloride, both in diaphragm cells and in mercury cells. All of these methods involve the use of gaseous carbon dioxide as the carbonating agent.

It is, however, well known that sodium carbonate can be obtained by reacting caustic soda with sodium bicarbonate according to the equation:

$$NaOH + NaHCO_3 \rightarrow Na_2Co_3 + H_2O$$

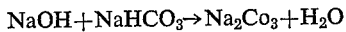

This reaction, however, has not been used industrially until recently, mainly because of the high price of sodium bicarbonate.

On the other hand, in all known processes the carbonation by means of gaseous $CO_2$ is carried out in the presence of large amounts of water included with the caustic soda solutions. This water must necessarily be separated from the sodium carbonate after crystallization. Actually the hydration of the sodium carbonate to the monohydrate, which is generally formed during the carbonation, is not sufficient for fixing all the water that is introduced by the caustic soda solutions. It then becomes necessary to separate an aqueous phase, saturated with sodium carbonate, which necessitates the recovery of the solutions and an expenditure of energy for their evaporation.

The present invention has for its principal object to provide a commercially applicable and easy method for the carbonation of the caustic soda solutions. The invention makes it possible especially to eliminate the difficulties of crystallization of the sodum carbonate and the cost of separating the water from the caustic soda solutions.

Upon further study of the specification and appended claims other objects and advantages of this invention will become readily apparent.

According to this invention, sodium carbonate is obtained from caustic soda solutions by reaction of the same with a carbonating agent constituted at least partly of sodium bicarbonate. The process comprises adding to the caustic soda solution, in an amount at least sufficient to carbonate all the caustic soda present, a carbonating agent at least some of which is sodium bicarbonate, together with a sufficient amount of anhydrous sodium carbonate to obtain a product constituted substantially of sodium carbonate monohydrate, the latter then being calcined in a known manner to obtain sodium carbonate of high density.

The carbonation can be effected advantageously in a container provided with an agitating system and with means for introducing caustic soda solutions, sodium bicarbonate and anhydrous sodium carbonate, the container being equipped with tubes for the introduction of gas. Means is also provided for removing the monohydrate that is produced. As a container, use may be made of a mixer, either in the form of a rotating drum or a crystallization vessel, or any other apparatus in which solids can be reacted with liquids and the resulting products crystallized. The apparatus is adapted for operation either continuously or intermittently, as desired.

The caustic soda solutions which may be carbonated according to this invention are those which are produced by the electrolysis of sodium chloride in cells with mercury cathodes, or may be pure caustic soda solutions as obtained from any other source. The concentration of these solutions should be relatively high, at least about 350 gms. of sodium hydroxide per kilogram of the caustic soda solution, preferably, above 400 gms. of sodium hydroxide, the upper limit being about 700 gms.

As a carbonating agent, either sodium bicarbonate alone or sodium bicarbonate and carbon dioxide may be used, either being introduced simultaneously or successively. The amount of carbonating agent should be at least substantially equal, if not at least equal, to that which is necessary to neutralize all the caustic soda present. In an apparatus for continuous operation, the additions of reactants are easily adjusted to arrive at this result.

The amount of anhydrous sodium carbonate that is added should be sufficient to fix substantially all, or preferably all of the surplus water of the caustic soda solutions in the form of monohydrate.

The three ingredients of the reaction mixture, the caustic soda solution, the sodium bicarbonate and the anhydrous sodium carbonate, may be added either simultaneously or successively in any order desired.

It has, however, been observed that a more cleanly crystallized monohydrate, and one which upon dessication yields a dense soda free from powder is produced by adding the ingredients in either of the following orders: first the bicarbonate, the carbonate, the caustic soda and then the other part of the caustic soda, the bicarbonate and the carbonate.

A particularly satisfactory result has been obtained by first introducing half of the amount of anhydrous sodium carbonate to be used, then adding all the bicarbonate, followed by the other half of the sodium carbonate, and lastly the caustic soda.

In a continuously functioning apparatus, the desired order of introduction of the reactants may be established by providing a suitable arrangement for feeding or introducing the reactants along the path that the mixture takes through the reactor. For example, a plurality of mixing vessels connected in series would be suitable, a particular portion being fed to each vessel.

The different reactants are preferably and advantageously used in the conditions and at the temperatures at which they are produced, e.g., caustic soda coming from the electrolysis cells at about 70° C., bicarbonate damp (about 12% water) and cold (about 20° C.), and sodium carbonate as it comes from the driers at about 180° C.

The reaction can, in general, be conducted at any temperature in the range of 80–107° C. It is preferable, however, that the operating conditions of the reactor air controlled so as to keep the temperature during the reaction at about 100° C.

A product is thus obtained which consists essentially of sodium carbonate monohydrate, the same being practically identical with that obtained by adding 16% of water to the calcined sodium carbonate.

This monohydrated sodium carbonate is then used for producing sodium carbonate of high density, generally called "dense soda," by calcination of the same.

The process of this invention lends itself particularly well to the different stages of manufacture of sodium carbonate by the Solvay (ammonia) process. In fact, it has been found particularly advantageous to use, as a carbonating agent, the crude bicarbonate that is precipitated during carbonation of the ammoniacal solutions of sodium chloride.

This crude sodium bicarbonate, which has not been given any purification treatment, is impure and poorly crystallized. It is never used as such, but is converted into sodium carbonate. It does, however, constitute a convenient carbonating agent, and is useful for carrying out the process of this invention. Carbonation of caustic soda solutions with the bicarbonate of soda is not accompanied by any of the inconveniences such as are encountered with the use of gaseous carbon dioxide.

It is evident, however, that when using the crude bicarbonate directly as obtained from soda manufacture, and which still contains some ammonia, the carbonation should be carried out in a gas-tight container provided with means for reclaiming the liberated ammonia. For collecting the ammonia, the container in which the carbonation is effected may be flushed with a current of air.

The process of this invention permits the direct conversion of crude sodium bicarbonate from the soda works into dense monohydrated sodium carbonate, thus eliminating the expense of the steps of the calcination of the light sodium bicarbonate and the hydration of the same as heretofore has been the conventional method of producing dense soda.

The anhydrous sodium carbonate which is required for the fixation of excess water, in accordance with the process of this invention, may advantageously consist of the low density sodium carbonate, also called "light soda," (apparent specific gravity of about 0.5) and such as produced by the calcination of the crude sodium bicarbonate which precipitates during the carbonation of the ammoniacal brines in the Solvay process. Further, the process of the present invention may be carried out as a combination with, or modification of, the apparatus employed for producing sodium carbonate by the Solvay process, the carbonation being carried out in the reactor used for making dense sodium carbonate.

In a conventional method of making dense soda, 16% by weight of water is added to light soda, and the sodium carbonate monohydrate crystallized out. The monohydrate is then calcined to produce sodium carbonate.

According to the present invention, a mixture of light soda, as aforementioned, and crude sodium bicarbonate, and instead of water, an aqueous solution of caustic soda are introduced into an apparatus, for example, a mixer, designed for the crystallization of the monohydrate. Using the process, sodium carbonate monohydrate can thus be obtained in practically the same condition as heretofore secured from light soda and water, and which hydrate after calcining, e.g., in a rotary drier, in known manner, a dense soda is recovered which is practically identical with the dense soda of commerce.

By adding a limited volume of saturated sodium carbonate solution to the reaction mixture of caustic soda solution, sodium bicarbonate and anhydrous sodium carbonate, the greatest fluidity of the reaction mixture is obtained. The volumetric ratio of saturated sodium carbonate solution to volume of unmodified reaction mixture is about 21.6:1 to 1.83:1. This high fluidity avoids the necessity of diluting the reaction mixture by additional water. This process is advantageously carried out in a crystallization vat.

The preparation of the sodium carbonate monohydrate in the presence of a large volume of the saturated solution makes it possible to carry out the crystallization under very favorable conditions and to readily regulate the proportions of the ingredients of the reaction mixture by controlling the composition of the mother liquor.

During the production of the monohydrate in a vat, the important factors which affect crystallization are the density of the suspension, the method and intensity of the agitation, the rate of production, and the temperature of crystallization.

In general, the density of the suspension in the vat is kept between 100 and 800 grams per liter so that well-formed crystals are obtained.

Agitation of the suspension can be accomplished by any known method, such as by means of a motor driven propeller type mechanical agitator or by the use of a gas jet.

A crystallization vat that is especially suitable for the process of this invention is formed of a cylindrical body with a conical-shaped bottom. Above the bottom portion there is provided a central chamber or chimney in which the suspension circulates, e.g. from the top to the bottom, or from the bottom to the top, and in the upper part of which there are means for introducing the reactants.

The rate of production has a great effect on the crystallinity of the product. If the crystals grow too rapidly, the product will be poorly crystallized. A rate of production of 40–80 kg./m³/h. (kg./cu. meter/hr.) is suitable for obtaining well-formed crystals.

Finally, a temperature of crystallization as high as possible, but below 107° C. is employed.

Where the crystallization is intermittent, after completion of the reaction, a suspension of the monohydrate in a saturated solution of sodium carfonate is obtained. When a continuous process is used, the crystalline suspension is removed from the bottom of the vat either continuously or from time to time.

In each case the sodium carbonate monohydrate is separated from the solution by filtration, and preferably drying the same. The solution is used again while the monohydrate is calcined to obtain dense soda.

Descriptions of two different installations that function in accordance with this invention will now be given as examples, but without limiting the invention to these specific examples.

EXAMPLE 1

A mixer consisting of a trough in which two horizontal shafts equipped with agitator blades rotate slowly, is closed by a cover having openings to permit the introduction of solids. The mixer is preferably provided with a distributor (ramp) perforated with holes, the distributor being positioned longitudinally under the cover.

Into the mixer which is kept at about 100° C. the following ingredients are introduced successively during the rotation of the agitator blades:

24.6 kg. of light soda at a temperature of 180° C. and containing 98% of $Na_2CO_3$ and 2% of $NaHCO_3$ 49.2 kg. of crude cold moist bicarbonate, and such as is deposited on the filters of the Solvay soda process, as aforedescribed, and having the following composition—

|   | Percent |
|---|---|
| $NaHCO_3$ | 84 |
| $Na_2CO_3$ | 3 |
| $H_2O$ | 12 |
| $NH_3$ | 1 |

24.6 kg. light soda at a temperature of 180° C.

40.0 kg. caustic electrolytic caustic soda heated to 70° C. and which comprises 500 grams of NaOH per kilogram (kg.)

The light soda and the crude bicarbonate are introduced through the holes in the cover which are then immediately closed, while the caustic soda is introduced by way of the perforated distributor.

The temperature of the contents of the mixer during mixing drops to about 100° C. because of evaporation, and the following reactions occur—

(1) NaOH (caustic lye) + $NaHCO_3$ (crude bicarbonate containing ammonia) reacts to form $Na_2CO_3.H_2O$ (monohydrate) and (2) $Na_2CO_3$ (light soda) + $H_2O$ (caustic lye) which reacts to form $Na_2CO_3.H_2O$ (monohydrate)

During these reactions the ammonia contained in the crude bicarbonate is set completely free and is carried off by the steam or by a current of air. It is recovered by a solution of NaCl.

After about 45 minutes, the reactions have terminated. The mixer is then emptied of its contents, the same consisting essentially of sodium carbonate monohydrate which is composed essentially of crystals with well developed faces whose size is of the order of 0.25 mm.

The monohydrate is dried and calcined in a rotating drying drum that is traversed by a current of hot air or carbon dioxide. During this process the residue of bicarbonate which remains in the moist monohydrate is destroyed.

The resultant calcined product consists of sodium carbonate of high density. The product is useful similarly as the dense commercial sodas, both as to granulation and as to apparent specific gravity. The sodium carbonate thus produced can replace all the dense commercial sodas in all their varied uses, and especially in glass making processes.

In the following table a comparison is given of the physical characteristics of commercial dense soda with that produced by the process of this invention.

*Table I*

| Product | Granulometric composition, g./kg. | | | | | | | Apparent specific gravity |
|---|---|---|---|---|---|---|---|---|
|  | 4.0 to 2.0, mm. | 2.0 to 1.0, mm. | 1.0 to 0.5, mm. | 0.50 to 0.25, mm. | 0.25 to 0.125, mm. | 0.125 to 0.062, mm. | Less than 0.062, mm. |  |
| Dense commercial soda | 22 | 23 | 277 | 480 | 159 | 36 | 13 | 0.95 |
| Dense soda of this invention | 80 | 64 | 102 | 120 | 490 | 140 | 4 | 0.90 |

EXAMPLE 2

A mixer similar to that of Example 1 but functioning continuously is used for feeding a drier, also functioning continuously.

The additions of light soda, of crude bicarbonate and of caustic soda solution are proportional to the quantities used batch-wise or discontinuously in Example 1. These amounts of the reactants are moreover fixed so as to keep the materials in the reactor for a convenient length of time, e.g. about 45 minutes.

The well crystallized monohydrate leaves the mixer and passes directly into the drier, to be transformed there into dense soda.

A fluid tight device, either a bladed shaft or a screw, can be interposed between the mixer and the drier to prevent any change of atmosphere during the transfer. The gas which leaves the reactor will need to be treated only for the removal of ammonia.

EXAMPLE 3

The following Table II gives the results of carbonation processes conducted in a cylindrical vat of 30 cm. diameter and 60 cm. height, provided with a conical bottom 17 cm. high, there being a central chamber or chimney and conduits for the introduction of sodium bicarbonate, caustic soda, and light soda, as described. The liquid material is introduced into the vat first so that the solid reactants when introduced will fall upon a liquid surface in the vat.

In this example the reactants have the same compositions as in Example 1.

Before each experiment the vat is filled, to complete immersion of the central chimney, with a solution of sodium carbonate containing 305 g. $Na_2CO_3$/kg. The solution is heated to 104° C., and is then kept at this temperature by a thermostat. The agitator is then put into operation, and crystallization is initiated by the introduction of crystals of monohydrate.

The devices for the introduction of bicarbonate, caustic soda and light soda are put into action simultaneously.

Every hour a tapping device brings the liquid level in the vat to its initial position. The suspension taken from the bottom of the vat is dried. The sodium carbonate monohydrate is then calcined as in Example 1.

Table II

| Experiment Number | Method of Agitation | Amount of gas for agitation Liters/Hour | Reactant amounts, kg/hour | | | $Na_2CO_3 \cdot H_2O$ Seeding Crystals | Density of Suspension, grams/liter |
|---|---|---|---|---|---|---|---|
| | | | NaHCO₃ | NaOH | Na₂CO₃ | | |
| 1 | Gas | 2,300 | | | 2.55 | 4 | 500 |
| 2 | ⎫ | ⎧ | 0.48 | 0.46 | 2.00 | 2 | 500 |
| 3 | Propeller, 800 turns/minute. | ⎨ | 0.48 | 0.50 | 2.00 | (*) | 490 |
| 4 | ⎬ | ⎨ | 0.96 | 1.00 | 4.00 | 3 | 550 |
| 5 | ⎭ | ⎩ | 0.96 | 1.00 | 4.00 | 3 | 800 |
| 6 | Gas | 300–500 | 0.48 | 0.50 | 2.00 | 4 | 100 |
| 7 | do | 1,100 | 0.48 | 0.50 | 2.00 | 4 | 300 |
| 8 | do | 1,500 | 0.48 | 0.50 | 2.00 | 4 | 650 |
| 9 | do | 2,300 | 0.48 | 0.50 | 2.00 | 4 | 500 |

| Experiment Number | $Na_2CO_3 \cdot H_2O$, kg./hour | Granulometric composition of the dense soda | | | | | | | Apparent specific gravity of the dense soda |
|---|---|---|---|---|---|---|---|---|---|
| | | >2, mm. | 2–1, mm. | 1.0–0.5, mm. | 0.5–0.25, mm. | 0.25–0.125, mm. | 0.125–0.062, mm. | <0.062, mm. | |
| 1 | 3.00 | 2 | 4 | 79 | 447 | 376 | 85 | 7 | 0.91 |
| 2 | 2.94 | 4 | 16 | 110 | 330 | 452 | 100 | 18 | 1.01 |
| 3 | 2.98 | 0 | 1 | 4 | 294 | 584 | 103 | 14 | 1.01 |
| 4 | 5.96 | 0 | 4 | 17 | 115 | 463 | 350 | 51 | 0.86 |
| 5 | 5.96 | 0 | 2 | 11 | 109 | 434 | 391 | 53 | 0.83 |
| 6 | 2.98 | 0 | 10 | 29 | 259 | 494 | 186 | 22 | 0.89 |
| 7 | 2.98 | 2 | 8 | 175 | 537 | 230 | 43 | 5 | 0.92 |
| 8 | 2.98 | 4 | 9 | 127 | 517 | 264 | 67 | 12 | 0.91 |
| 9 | 2.98 | 0 | 3 | 23 | 369 | 419 | 160 | 26 | 0.91 |

*Recycling of the mother liquor containing seeding crystals.

The data given in Table II shows that the following results are attained:

(1) The low densities of the suspension lead to products of low specific gravity, the larger portions of which are constituted of poorly formed crystalline agglomerates. On the other hand, experiments with suspension having densities of the order of 500 g./liter have produced dense sodas of higher specific gravity and constituted mainly of large well developed crystals;

(2) A production of 3 kg./hour, or 65 kg./m.³ hour leads to satisfactory products; double that, or 130 kg./m.³ hour leads to poorly crystallized products, the rate of crystallization being too high; and (3) Agitation by mechanical agitators keeps the crystals completely in suspension, even in suspensions of high density. Experiments 2 and 3 produced very good dense sodas. Agitation by gas jets required the injection of large quantities of gas (at least 1500 l./hour for a suspension of 500 g./l.) to avoid settling of the crystals. Experiments 7, 8 and 9 resulted in producing a good dense soda.

While the invention has been described and examples of the same given, it will be understood that various changes may be made in the process and with respect to substitutions made in reactants and their amounts by those skilled in the art. Such modifications are considered to come within the scope of the invention, except as restricted in the appended claims.

What is claimed is:

1. A process for the production of dense sodium carbonate which comprises reacting an aqueous sodium hydroxide solution, light density sodium carbonate containing a small amount sodium bicarbonate, and crude sodium bicarbonate containing ammonia in sufficient proportions to convert substantially all of the aqueous sodium hydroxide solution to sodium carbonate monohydrate, and separating the reaction product formed consisting essentially of sodium carbonate monohydrate crystals, and thereafter drying and calcining the said monohydrate to produce sodium carbonate of high density.

2. A process for the production of sodium carbonate from sodium bicarbonate containing ammonia and produced as an intermediate in the Solvay process, and which comprises admixing therewith light soda composed of sodium carbonate containing a minor amount of sodium bicarbonate, and an aqueous sodium hydroxide solution containing approximately 500 grams NaOH per kilogram of said solution in sufficient proportions to convert substantially all of the aqueous sodium hydroxide to sodium carbonate monohydrate, and heating the resultant mixture to cause the constituents to react and form sodium carbonate monohydrate, and then separating said monohydrate, and calcining said monohydrate to produce sodium carbonate.

3. A process for the production of sodium carbonate monohydrate comprising:
(a) reacting an aqueous solution of sodium hydroxide with an excess of sodium bicarbonate whereby substantially all of said sodium hydroxide is converted to sodium carbonate monohydrate; and
(b) reacting the solution of (a) with anhydrous sodium carbonate whereby the water of solution is converted to sodium carbonate monohydrate.

4. The process of claim 3 wherein the reactants are introduced successively into a reaction chamber.

5. The process of claim 3 wherein the reactants are introduced to a reaction chamber in the following order,
(1) about 50% of the anhydrous sodium carbonate,
(2) all of the bicarbonate,
(3) the remaining 50% of the anhydrous sodium carbonate, and
(4) all of the aqueous sodium hydroxide.

6. A process for the production of anhydrous sodium carbonate of high density comprising:
(a) reacting an aqueous solution of sodium hydroxide with an excess of sodium bicarbonate whereby substantially all of said sodium hydroxide is converted to sodium carbonate monohydrate;
(b) reacting the solution of (a) with anhydrous sodium carbonate whereby the water of solution is converted to sodium carbonate monohydrate;
(c) separating said sodium carbonate monohydrate;
(d) drying the separated product of (c); and
(e) calcining said sodium carbonate monohydrate to form anhydrous sodium carbonate of high density.

7. A process for the production of sodium carbonate monohydrate comprising:
(a) reacting an aqueous solution of at least 40% sodium hydroxide with an excess of sodium bicarbonate whereby substantially all of said sodium hydroxide is converted to sodium carbonate monohydrate; and
(b) reacting the solution of (a) with anhydrous sodium carbonate whereby the water of solution is converted to sodium carbonate monohydrate.

8. A process for the production of anhydrous sodium carbonate of high density comprising:
 (a) mixing an aqueous solution of sodium hydroxide with an excess of sodium bicarbonate;
 (b) adding to (a) a saturated solution of sodium carbonate;
 (c) reacting the mixture of (a) in (b) whereby substantially all of said sodium hydroxide is converted to sodium carbonate monohydrate;
 (d) reacting said aqueous solution of (a) with anhydrous sodium carbonate whereby the water of solution is converted to sodium carbonate monohydrate;
 (e) separating said sodium carbonate monohydrate and recycling said saturated solution of sodium carbonate (b);
 (f) drying the separated product of (e); and
 (g) calcining said sodium carbonate monohydrate to form anhydrous sodium carbonate of high density.

9. A process for the production of anhydrous sodium carbonate of high density comprising:
 (a) mixing and reacting at a temperature between 100–107° C.:
  (A) an aqueous solution of caustic soda containing more than 350 gm. NaOH/Kgm obtained by electrolysis of sodium chloride in a mercury cell;
  (B) sufficient crude moist sodium bicarbonate obtained as an intermediate in the Solvay process to transform said solution of caustic soda into sodium carbonate monohydrate;
  (C) sufficient light weight sodium carbonate obtained by calcination of crude bicarbonate in the Solvay process to convert the water of said solution of caustic soda into sodium carbonate monohydrate;
 (b) separating sodium carbonate monohydrate;
 (c) drying said sodium carbonate monohydrate; and
 (d) calcining said sodium carbonate monohydrate to form anhydrous sodium carbonate of high density.

10. A process for the production of anhydrous sodium carbonate of high density comprising:
 (a) mixing and reacting at a temperature between 100–107° C.:
  (A) approximately 1 part aqueous solution of caustic soda containing approximately 500 gm. NaOH/Kgm of solution obtained by electrolysis of sodium chloride in a mercury cell;
  (B) approximately 1.25 parts crude moist sodium bicarbonate obtained as an intermediate in the Solvay process to transform said solution of caustic soda into sodium carbonate monohydrate; and
  (C) approximately 1.25 parts light weight sodium carbonate obtained by calcination of crude bicarbonate in the Solvay process to convert the water of said solution of caustic soda into sodium carbonate monohydrate;
 (b) separating sodium carbonate monohydrate;
 (c) drying said sodium carbonate monohydrate; and
 (d) calcining said sodium carbonate monohydrate to form anhydrous sodium carbonate of high density.

11. A process for the production of anhydrous sodium carbonate of high density comprising:
 (a) mixing and reacting at a temperature between 100–107° C. in a saturated solution of sodium carbonate to form a suspension having a density of approximately 500 grams/liter:
  (A) approximately 1 part aqueous solution of caustic soda containing approximately 500 gms. NaOH/Kgm of solution obtained by electrolysis of sodium chloride in a mercury cell;
  (B) approximately 1.25 parts crude moist sodium bicarbonate obtained as an intermediate in the Solvay process to transform said solution of caustic soda into sodium carbonate monohydrate; and
  (C) approximately 1.25 parts light weight sodium carbonate obtained by calcination of crude bicarbonate in the Solvay process to convert the water of said solution of caustic soda into sodium carbonate monohydrate;
 (b) separating sodium carbonate monohydrate;
 (c) recirculating said saturated solution of sodium carbonate;
 (d) drying said sodium carbonate monohydrate; and
 (e) calcining said sodium carbonate monohydrate to form anhydrous sodium carbonate of high density.

12. A process for the production of anhydrous sodium carbonate of high density comprising:
 (a) reacting at a temperature between 100–107° C. and at a rate of production of 40–80 kilograms/cubic meter/hour a water solution of NaOH, $NaHCO_3$ and $Na_2CO_3$ in the approximate ratio 1:1:4;
 (b) separating sodium carbonate monohydrate;
 (c) drying said sodium carbonate monohydrate; and
 (d) calcining said sodium carbonate monohydrate to form anhydrous sodium carbonate of high density.

13. A process for the production of anhydrous sodium carbonate of high density comprising:
 (a) mixing NaOH, $NaHCO_3$ and $Na_2CO_3$ in water solution in the approximate ratio 1:1:4;
 (b) adding a saturated solution of $Na_2CO_3$ to (a) in a ratio of (b) to (a) variation of 21.6:1 to 1.83:1;
 (c) reacting (a) in (b) at a temperature between 100–107° C. and a rate of production of 40–80 kilograms/cubic meter/hour;
 (d) separating sodium carbonate monohydrate and recycling (b);
 (e) drying said sodium carbonate monohydrate; and
 (f) calcining said sodium carbonate monohydrate to form anhydrous sodium carbonate of high density.

References Cited by the Examiner
UNITED STATES PATENTS

| | | | |
|---|---|---|---|
| 516,075 | 3/94 | Browne | 23—63 |
| 2,792,283 | 5/57 | Hill et al. | 23—63 |
| 3,061,409 | 10/62 | Robson et al. | 23—63 |
| 3,103,413 | 9/63 | Blumenthal | 23—63 |

MAURICE A. BRINDISI, *Primary Examiner.*